(12) United States Patent
Mile'n et al.

(10) Patent No.: US 6,628,642 B1
(45) Date of Patent: Sep. 30, 2003

(54) SYNCHRONIZATION DEVIATION DETECTION

(75) Inventors: Anders Mile'n, Enskede Gärd (SE); Bengt Norstedt, Djursholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/382,390

(22) Filed: Aug. 25, 1999

(51) Int. Cl.[7] .................................................. H04J 3/06
(52) U.S. Cl. ........................ 370/350; 370/331; 370/503
(58) Field of Search ............................... 455/436, 437, 455/438, 439, 442; 370/328, 331–333, 350, 503, 516, 508, 519; 375/356

(56) References Cited

U.S. PATENT DOCUMENTS

| | | | | |
|---|---|---|---|---|
| 5,345,448 A | * | 9/1994 | Keskitalo | |
| 5,640,679 A | | 6/1997 | Lundqvist et al. | 455/33.2 |
| 5,722,080 A | * | 2/1998 | Kondo | 455/502 |
| 5,828,659 A | * | 10/1998 | Teder et al. | 370/328 |
| 6,014,376 A | * | 1/2000 | Abreu et al. | 370/350 |
| 6,091,757 A | * | 7/2000 | Cudak et al. | 375/130 |
| 6,246,673 B1 | * | 6/2001 | Tiedemann et al. | 370/333 |
| 6,259,683 B1 | * | 7/2001 | Sekine et al. | 370/328 |

FOREIGN PATENT DOCUMENTS

| | | | |
|---|---|---|---|
| EP | 0 848 508 | 6/1998 | |
| FI | WO 99/30519 | * 6/1999 | H04Q/7/30 |
| WO | WO94/30024 | 12/1994 | |
| WO | WO99/37037 | 7/1999 | |

* cited by examiner

Primary Examiner—Ken Vanderpuye

(57) ABSTRACT

A method for monitoring synchronization deviation in a mobile telecommunication system is disclosed. The system records the deviation in the synchronization between base stations which may be computed from measurements made at handover of a mobile station between base stations and when the deviation exceeds a predetermined threshold, an alarm is triggered which provides an alert to adjust the synchronization of the system.

14 Claims, 3 Drawing Sheets

SYNCHRONIZATION DEVIATION DETECTION

BACKGROUND

The present invention relates to a method and apparatus for monitoring synchronization between base stations in a telecommunications system and, more specifically, to a method and apparatus for detecting synchronization deviation between the base stations.

In a cellular telecommunication system such as cellular telephone system 100 illustrated in FIG. 1, there are a plurality of cells, for example, cells $C_0$–$C_9$. Typically, each of the cells $C_0$–$C_9$ has a single base station, for example, base stations $B_0$–$B_9$. In general, each base station $B_0$–$B_9$ transmits and receives communication signals, using a base transceiver station (BTS), to and from mobile units within the corresponding cell. Therefore, the system of FIG. 1 includes $BTS_0$–$BTS_9$ corresponding to base stations $B_0$–$B_9$.

When a mobile unit such as $M_4$ moves from a cell, $C_0$, covered by a first base station transceiver $BTS_0$ towards another cell, $C_1$, covered by a second base station transceiver $BTS_1$, the responsibility for communication with the mobile unit $M_4$ must be transferred from $BTS_0$ to $BTS_1$. Such transfer in conjunction with an established connection to the mobile station is usually called a "handover".

Handover requires careful system management to reduce the risk of the established connection being temporarily interrupted or completely lost during the handover. Such interruption and/or loss of service may result from, among other things, lack of synchronization between reference timing sources employed by the first base station and the second base station. Therefore, maintaining synchronization between base stations in cellular telecommunication system is extremely important.

The BTS uses an external or internal reference timing source to generate accurate radio carrier frequencies (i.e., such as one having an absolute fault of approximately 0.1 parts per million [ppm]) as well as to generate accurate timing of the bit stream transmitted over the radio interface. In instances where the BTS uses an external source as a timing reference synchronization, the clock source is located in the public switching telephone network (PSTN). The BTS synchronization is then taken from the PSTN via the mobile switching center (MSC), the base station controller (BSC) and transmission networks. Outside the United States, a common timing reference is used for each BTS in a network. If the BTS uses an internal clock source on the other hand, then this source is usually a high stability oscillator. In the United States, each BTS has a local (internal) source.

If the timing reference employed by a BTS is unreliable, a mobile station attempting to synchronize itself to the BTS may encounter difficulties. In extreme cases, the mobile unit may not be able to access the BTS. For example, referring again to FIG. 1, consider that mobile unit $M_4$ has a call set-up using $BTS_0$ corresponding to base station $B_0$. $BTS_0$ is synchronized to the PSTN and $M_4$ is synchronized to $BTS_0$. Mobile station $M_4$ will typically be requested to measure and report signal strength associated with neighboring base stations' transmission for the purpose of identifying when handover to another base station is desirable. As $M_4$ moves towards $BTS_1$, if the timing reference employed by $BTS_1$ is not reliable and, therefore, $BTS_1$ is transmitting information at a different frequency and/or with a different timing than that expected by $M_4$, then $M_4$ may not be able to read the base station identity code (BSIC) associated with $BTS_1$. In such a situation, $M_4$ will not report $BTS_1$ as a handover candidate to $BTS_0$ which is currently in communication with $M_4$. If $BTS_1$ is not synchronized with the PSTN, the call will drop after $M_4$ enters an area where only $BTS_1$ can provide communication service support.

Unreliable sources of synchronization can cause frequency drift of the base stations over a period of time. These sources are one reason that cause calls to be dropped, lost or interrupted. Other reasons may include unsynchronized clocks, faulty configuration of intermediate network modules such as DXXs, DXCs and BSCs as well as BTS faults and link breaks.

The synchronization problems usually come to the attention of system operators via, among other means, end user (i.e., subscriber) complaints of dropped calls. As a result, identifying dropped calls that result from lack of synchronization is a time consuming process. Identifying a synchronization problem from statistical data is also a very slow and unreliable process, for example, in cases where the mobile unit of a particular brand is unable to read a base station identity code (BSIC) from a neighboring cell. Furthermore, if the synchronization deviation is changing slowly, the detection of this problem becomes harder.

What is desired, therefore, is a method and apparatus for detecting synchronization deviation in a cellular telecommunications system.

SUMMARY

It is an object of the present invention to overcome the deficiencies described above by providing a method for utilizing existing functionality of a mobile unit for monitoring synchronization deviation in a cellular telecommunications system.

According to exemplary embodiments of the present invention, a system for monitoring synchronization in a radio telecommunication system is disclosed which comprises a first and a second base station each having a transceiver associated therewith; at least one mobile station having a transceiver and communicating with the first base station prior to being handed over to the second base station; a processor, associated with the at least one mobile station for determining a time difference value between a signal received from the first base station and a signal received from the second base station, wherein the mobile station transmits the time difference value to the system; and a controller, within the system, for receiving said time difference value and determining whether the first and second base stations are synchronized based on the time difference value.

Other embodiments of the present invention disclose a method for maintaining synchronization in a radio telecommunication system having a plurality of base stations and a plurality of mobile stations. The method comprises the steps of monitoring synchronization deviation between at least one pair of base stations within the plurality of base stations, wherein a deviation in the synchronization is computed by a base station controller (BSC) based on values reported to the BSC by a mobile station being handed over from a first one of the pair of base stations to a second one of the pair of base stations and on a value reported to the BSC by a base station transceiver associated with the second of said base stations; and triggering an alarm if the monitoring indicates that a predetermined threshold for a deviation in the synchronization has been exceeded.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION

Figure 1:
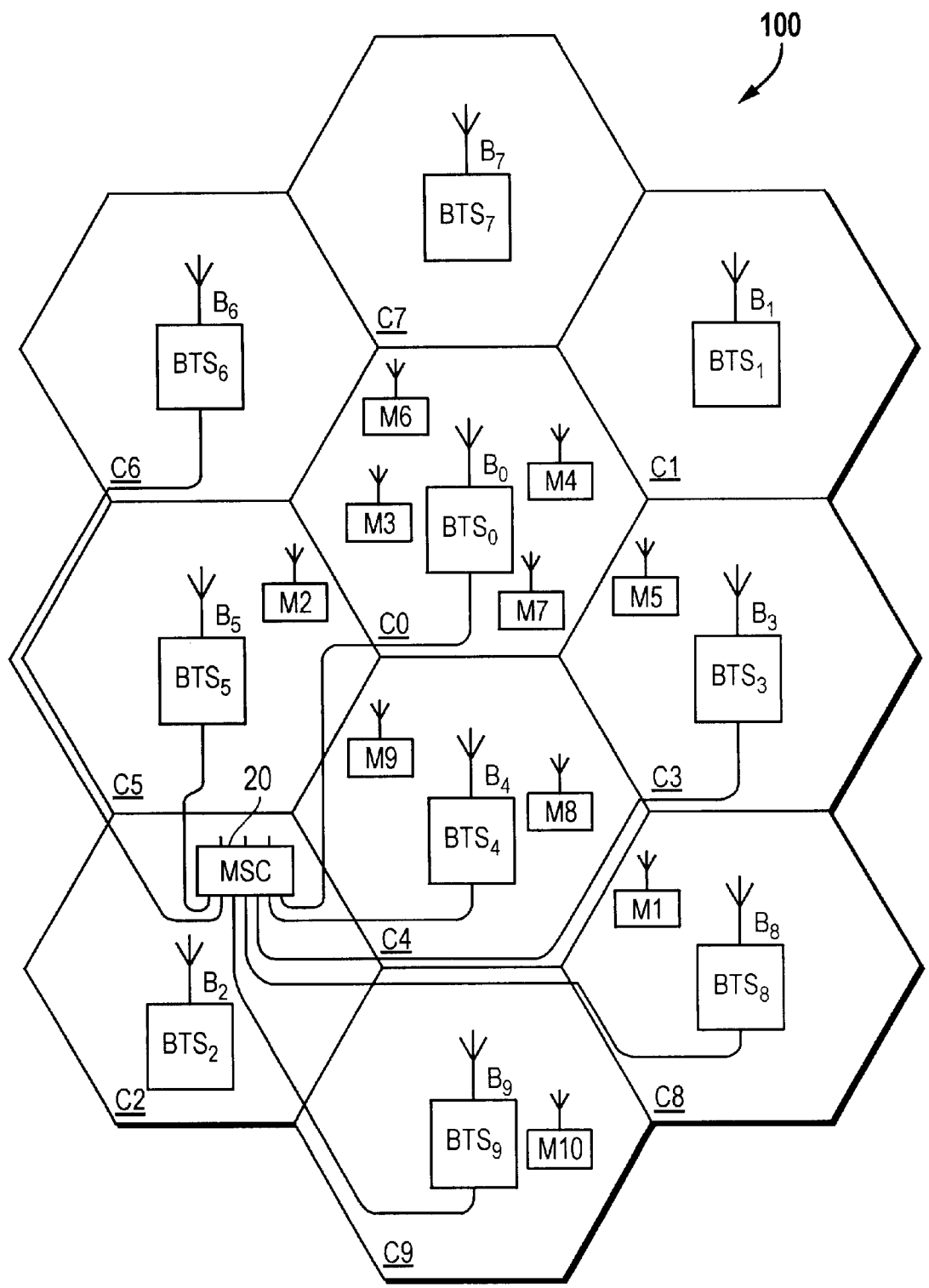
FIG. 1 illustrates a conventional cellular telecommunications communications network.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other protocols, including, but not limited to, frequency division multiple access (FDMA), code division multiple access (CDMA), or some hybrid of any of the above protocols. Likewise, some of the exemplary embodiments provide illustrative examples relating to the GSM system, however, the techniques described herein are equally applicable to radio base stations in any system.

A mobile station may be able to receive signals from a plurality of base stations. Upon instruction from the system and when the mobile station is not otherwise occupied e.g., transmitting or receiving, it can then measure the signal strength of these received signals and communicate the measured values to a base station controller (BSC). The BSC uses these measurements to identify base stations as candidates for handover when the mobile station moves away from the base station that it currently is in communication with. The signals received by the mobile station from the various base stations may also enable the mobile station to, among other things, determine the relative time synchronization (e.g., frame sync) between the transmissions of the plurality of base stations from which the mobile station is capable of receiving signals. Thus, in accordance with exemplary embodiments of the present invention, signals received by a mobile may be used to determine the relative frame offset between base stations, as well as for making signal strength measurements.

A general description and definition of the various values used in computing the frame synchronization is included here for a clear understanding of exemplary embodiments of the present invention. All BTSs within a system are synchronized at one time, such as when the network is established, and subsequently become unsynchronized. Under GSM, when a mobile station (MS) is to perform a handover from $BTS_0$ (current or old base transceiver station) to $BTS_1$ (or new base transceiver station), the following quantities are defined. The line of sight propagation delay between MS and $BTS_0$ is denoted as $t_0$; similarly the line of sight propagation delay between MS and $BTS_1$ is denoted as $t_1$. The difference in the local system time between $BTS_0$ and $BTS_1$ is denoted as RTD (real time difference or, also referred to as a frame offset value). The timing difference between $BTS_0$ and $BTS_1$ as measured by the MS is denoted as OTD (or, observed time difference). These values may all be varying over time due to, for example, movement of the MS and drift in oscillators associated with BTSs. The following equation describes the relationship between the various values listed above:

$$OTD = RTD + t_1 - t_0 \qquad (1)$$

A handover may be synchronized, pseudo synchronized or unsynchronized. The difference between a synchronized and a pseudo synchronized handover may be described as follows. In a synchronized handover, both BTSs (i.e., the BTSs involved in the handover) send the TDMA frame structure at the same time which means that the RTD real time difference is always 0 (frame offset=0). In a pseudo synchronized handover, the RTD (frame offset) between the BTSs is known by the system and the RTD is sent to the MS in a handover command message. Synchronized and pseudo-synchronized handovers use one signaling sequence where normal sized bursts are being used during the entire handover sequence.

The unsynchronized handover uses a slightly different and a longer signaling sequence which also contains a time alignment procedure where the mobile station starts to send several short bursts which will be received within a much bigger (i.e., a longer time) time slot. The BTS will measure where in the time slot the burst is received. The BTS will then inform the mobile station, in a info message, of what timing advance to use. That is, the BTS "tells" the mobile station how much earlier the mobile station should send the next normal sized burst.

In a synchronized handover of a MS to $BTS_1$ ordered by $BTS_0$, the MS sets the RTD value to zero (i.e., RTD=0) since the base stations (corresponding to $BTS_0$ and $BTS_1$) are synchronized. In a synchronized handover, all base stations send the frames at exactly the same time. Under normal conditions, since the mobile station is already synchronized to $BTS_1$ with which it is currently communicating via a traffic channel before the handover is executed, values for OTD, RTD and $t_0$ are available to MS. Therefore, the value for $t_1$ can be easily computed by MS without the MS having to rely on $BTS_1$ for providing this value. Using the equation above, $$t_1 = OTD - RTD + t_0 \qquad (2)$$

Upon completion of a handover, the MS may provide to $BTS_1$ the value of $OTD+t_0$ in the handover complete message. This value enables $BTS_1$ to obtain an estimate of RTD. In estimating the RTD, $BTS_1$ takes into consideration its estimate of $t_1$. In order to mitigate the effects of estimation errors and quantization effects however, additional processing may be needed for determining these values.

In a pseudo synchronized handover, it is assumed that the RTD is known to $BTS_0$ and that the mobile station supports this convention. When $BTS_0$ orders a psuedo-synchronized handover of a MS to $BTS_1$, $BTS_0$ reports the known RTD value to this MS. The RTD value is sent to the mobile station in a handover command. The mobile station then knows exactly when to send the first normal sized burst to $BTS_1$.

As the present invention is primarily concerned with lack of synchronization, the description of computations for the various values will now be described for a handover in which $BTS_0$ and $BTS_1$ are not synchronized with each other.

It should be pointed that the methods of the present invention are not limited to an unsynchronized system. In the unsynchronized case, the MS may be ordered to report a Time Difference Value (TDV) which is the sum of OTD and $t_0$ (i.e., TDV=OTD+$t_0$) to the base station controller (BSC) in a handover complete message. The target base transceiver station ($BTS_1$ in this case) may be programmed to report $t_1$ to the BSC. Based on these received values, the BSC can compute the RTD by using the equations given above which may also be expressed as:

$$RTD = OTD + t_0 - t_1 \quad (3)$$

which may also be expressed as $$RTD = TDV - t_1 \quad (4)$$

As described above, the RTD value is currently used for providing synchronization information to the mobile station in a pseudo-synchronized handover. It is expressed in half-bit periods each of which is, according to the GSM standard, 24/13 micro seconds. The computation for the RTD is performed in the BSC. In the unsynchronized case, the MS has to transmit very short burst to $BTS_1$ at handover. $BTS_1$ will then measure the propagation delay to the MS and reports it to the MS in the next message. The MS can then use normal sized bursts.

According to exemplary embodiments of the present invention, the system, e.g., the BSC may maintain a record of the computed frame offset values (or, RTD values) for each pair of base stations in the mobile communications network. In the system of FIG. 1, for instance, a record of the frame offset values may be maintained for handovers between $BTS_0$ and each of $BTS_1$ to $BTS_9$; similarly, a record of frame offset values may be maintained for handovers between $BTS_1$ and each of $BTS_2$ to $BTS_9$. In addition, the BSC may compute a coefficient k based on the time difference measured by the mobile stations, which coefficient represents the synchronization deviation using the following equations:

$$k_m = P_m / Q_m \quad (5)$$

where $$P_m = \sum_{i=m-n}^{m} t_i s_i - 1/n \left( \sum_{i=m-n}^{m} t_i \right) \left( \sum_{i=m-n}^{m} s_i \right) \text{ and} \quad (6)$$

$$Q_m = \sum_{i=m-n}^{m} t_i^2 - 1/n \left( \sum_{i=m-n}^{m} t_i \right)^2 \quad (7)$$

where $s_i$ is RTD for sample i (i.e., handover number i), $t_i$ is the time at which RTD for sample i was measured, n is the number of samples and m is the number of the last sample. In order for the value of k to be valid, m must be greater than or equal to n.

A k is computed and maintained for each pair of base stations in the system. If the system consists of three base stations, X, Y and Z for example, then a k value may be computed and maintained for handovers between X and Y; another k value may be computed and maintained for handovers between Y and Z and a third k value may be computed and maintained for handovers between X and Z. The coefficient k may be monitored by the system to detect when the time deviation has reached an unacceptable level. An unacceptable level may be that at which the lack of synchronization within the network has reached a level at which handover becomes (or is about to become) difficult and breaks in communication will result if the deviation is allowed to increase. For example, the absolute value of $k_m$ may be used to monitor the deviation in the frame synchronization. If $k_m$ exceeds a maximum allowed deviation value, an alarm may be triggered. This may be expressed as:

if $|k_m| > X$, then Y where X is the maximum allowed deviation and Y is an alarm being triggered.

The alarm may prompt an operator to intervene and adjust the synchronization among the base stations. In response, the operator may, among other things, check the transport network, adjust the clock or change the clock.

Figure 2:
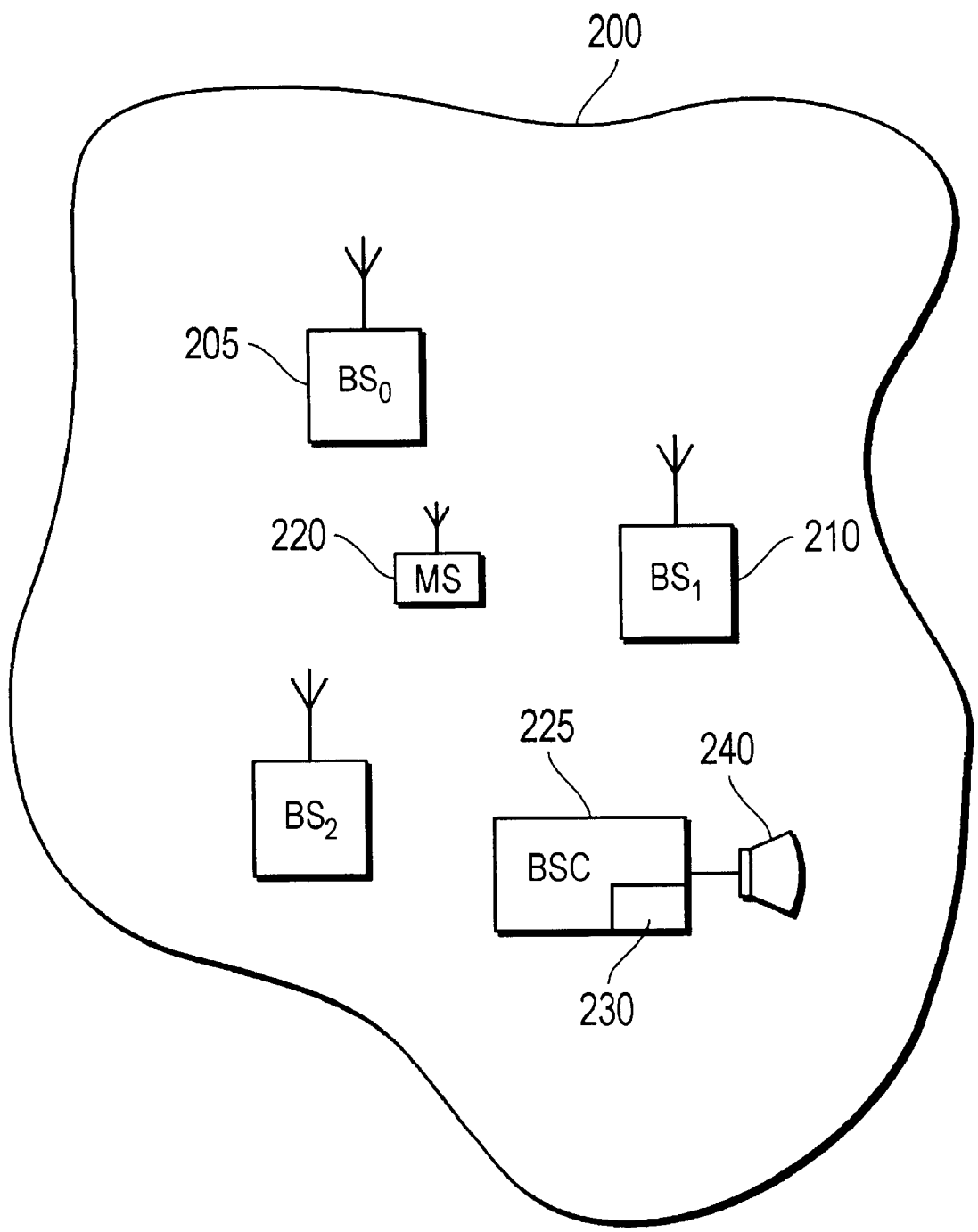
FIG. 2 illustrates a cellular communications telecommunications network for practicing exemplary embodiments of the present invention.

Exemplary embodiments of the present invention may be more clearly understood with reference to FIG. 2 which highlights a cellular telecommunications network with a storage device at the base station controller (BSC) for storing the various values reported to the BSC and values computed by the BSC.

Upon the completion of a handover from an originating base station transceiver 205 ($BTS_0$) to a destination base station transceiver 210 ($BTS_1$) within the cellular system 200, a time difference value between, for example, the timing of the frame structure transmitted by $BS_0$ and that transmitted by $BS_1$ (i.e., TDV which is the same as OTD+$t_0$) is determined by the mobile station 220 (MS) which has been handed over. This value can be communicated by the MS to the base station controller 225 (BSC). In addition, $BTS_1$ (the destination BTS) reports a $t_1$ value to the BSC. Each of $B_0$ and $B_1$ may represent any of the base stations in the cellular system as long as $B_0$ and $B_1$ are not the same base station. This information (i.e., OTD+$t_0$ and $t_1$) enables the BSC to compute not only the frame offset value, RTD, but also the coefficient k used to monitor the synchronization deviation. These values may be recorded in a storage device 230, e.g., RAM or secondary storage, associated with the BSC 225.

Figure 3:
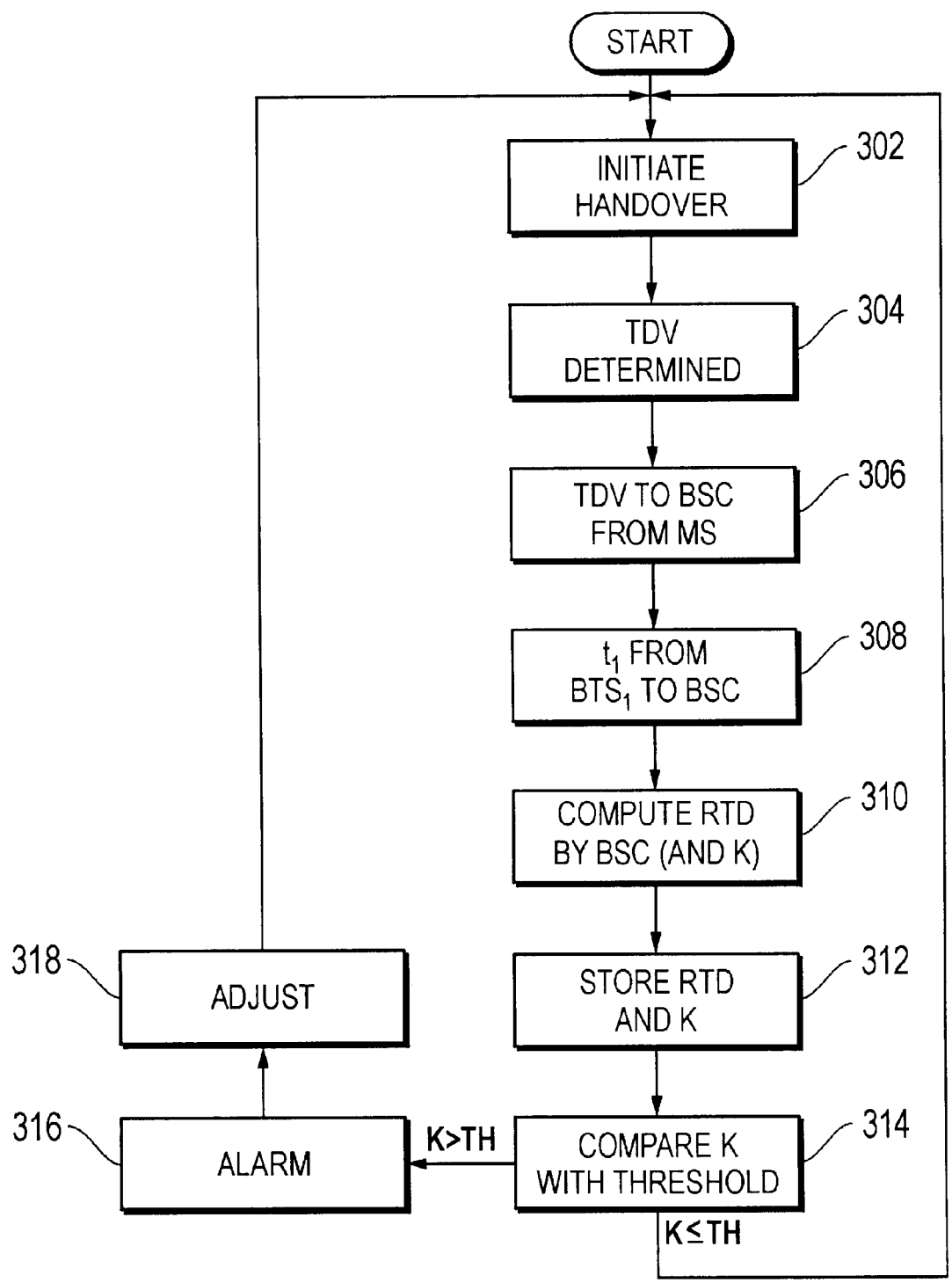
FIG. 3 illustrates a method for monitoring synchronization in a cellular telecommunication network according to exemplary embodiments of the present invention.

The coefficient k may be monitored as described above and an alarm 240 may be triggered if the synchronization deviation exceeds a predetermined threshold. The threshold may vary from system to system based on such variables as, for example, the number of base stations in the cellular system and traffic volume within the system. An exemplary method for performing the steps of the present invention for monitoring synchronization in a cellular telecommunication system may be illustrated with reference to FIG. 3.

In a cellular telecommunication system, a handover of a mobile station from a first base station to a second base station is initiated at 302. As part of the completion of the handover, the mobile station determines a time difference value (TDV) between transmissions received from the first and second base stations at 304. This value is communicated by the mobile station to the base station controller (BSC) at 306. The destination BTS ($BTS_1$) reports a $t_1$ value to the BSC at 308. The BSC computes a frame offset value (RTD) based on the reported TDV and $t_1$ and the deviation value at 310. These values are stored in the BSC at 312 in a location which corresponds to the pair of base stations involved in the handover at 302. This process is repeated for each handover that is completed.

In addition, as k is computed upon the completion of a handover between a pair of base stations, it is compared with a predetermined threshold (TH) value at 314. If the threshold value is exceeded, an alarm is triggered at 316 which results in an operator readjusting the system at 318. If k does not exceed the predetermined threshold at 314, the process of measuring, reporting and computing of values is repeated.

Similarly, after the system is synchronized at 318, the above mentioned functions are repeated.

It should be noted that exemplary methods of the present invention are not limited to application in unsynchronized networks. It could also be used in networks having synchronized handovers. As mentioned above, the network is synchronized at one time. The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being fully commensurate in scope with the following claims.

What is claimed is:

1. A system for detecting synchronization deviation in a radio telecommunication system comprising:

a first and a second base station each having a transceiver associated therewith;

at least one mobile station having a transceiver and communicating with said first base station prior to being handed over to the second base station;

a processor, associated with said at least one mobile station for determining a time difference value between a signal received from said first base station and a signal received from said second base station, wherein said mobile station transmits said time difference value to said system; and a controller, within said system, for receiving said time difference value and determining whether a synchronization deviation has occurred between said first and second base stations based on said time difference value.

2. The system of claim 1, wherein the controller comprises:

a processing means for computing a frame offset value from a plurality of received time difference values; and a comparing means for comparing the frame offset value with a predetermined threshold.

3. The system of claim 2, wherein the controller further comprises a storage means for storing the computed frame offset value.

4. The system of claim 2, wherein the controller further comprises an alarm means for triggering an alert when the comparing means indicates that the predetermined threshold has been exceeded, the alert indicating that the base stations within the system are not synchronized.

5. The system of claim 4, wherein the controller further comprises a correction means for correcting the synchronization.

6. The system of claim 4, wherein an operator synchronizes the base stations upon the triggering of the alert.

7. The system of claim 6, wherein the synchronization of the base stations comprises adjusting a clock of a base station transceiver.

8. The system of claim 6, wherein the synchronization of the base stations comprises adjusting a clock source which provides timing reference to the base station transceivers.

9. A method for maintaining synchronization in a radio telecommunication system having a plurality of base stations and a plurality of mobile stations, said method comprising the steps of:

monitoring synchronization deviation between at least one pair of base stations within said plurality of base stations, wherein a deviation in said synchronization is computed by a base station controller (BSC) based on at least one value reported to the BSC by a mobile station being handed over from a first one of said pair of base stations to a second one of said pair of base stations and on at least one value reported to the BSC by a base station transceiver associated with the second of said base stations; and triggering an alarm if the monitoring indicates that a predetermined threshold for a deviation in said synchronization has been exceeded.

10. The method of claim 9, further comprising the steps of:

communicating a time difference value by the mobile station to the BSC; and communicating a timing advance value by the base station transceiver of the second base station to the BSC.

11. The method of claim 10, further comprising the steps of:

computing, by said BSC, a coefficient representing a deviation in synchronization, said coefficient being computed from the values received by the BSC.

12. The method of claim 11, further comprising the steps of:

comparing the coefficient to a predetermined threshold; and triggering an alarm if the coefficient exceeds the threshold.

13. The method of claim 12, further comprising the step of prompting an operator to readjust the synchronization in the network.

14. The method of claim 12, wherein the readjustment of synchronization comprises adjustment of a clock of a base station transceiver.

* * * * *